US005897677A

United States Patent [19]

Flynn

[11] Patent Number: 5,897,677

[45] Date of Patent: Apr. 27, 1999

[54] SAMPLING OF HOT GLASSWARE IN A GLASSWARE MANUFACTURING SYSTEM

[75] Inventor: Robin L. Flynn, Waterville, Ohio

[73] Assignee: Owens-Brockway Glass Contianer Inc., Toledo, Ohio

[21] Appl. No.: 08/900,041

[22] Filed: Jul. 24, 1997

[51] Int. Cl.[6] .............................. C03B 5/24; C03B 9/04; C03B 9/44; B07B 1/00

[52] U.S. Cl. ............................ 65/29.12; 65/165; 65/260; 198/370.07; 198/457; 198/534; 209/522; 209/523; 209/524

[58] Field of Search ............................... 65/29.12, 29.14, 65/57, 58, 165, 260, 375; 198/370.07, 370.08, 370.11, 457, 534; 209/522, 523, 524

[56] References Cited

U.S. PATENT DOCUMENTS

| | | | |
|---|---|---|---|
| 3,687,651 | 8/1972 | Scholes | 65/161 |
| 3,732,086 | 5/1973 | Heyne | 65/28 |
| 4,004,904 | 1/1977 | Fergusson | 65/158 |
| 4,214,663 | 7/1980 | Schopp et al. | 209/552 |
| 4,273,235 | 6/1981 | Rustand | 198/372 |
| 4,332,606 | 6/1982 | Gardner | 65/158 |
| 4,349,368 | 9/1982 | Hüllen et al. | 65/28 |
| 4,354,865 | 10/1982 | Poad et al. | 65/29 |
| 4,369,873 | 1/1983 | Heuft | 198/367 |
| 4,421,542 | 12/1983 | Poad et al. | 65/158 |
| 4,614,531 | 9/1986 | Bishop et al. | 65/158 |
| 4,639,263 | 1/1987 | Kulikauskas | 65/158 |
| 4,762,544 | 8/1988 | Davey | 65/29 |
| 4,801,319 | 1/1989 | Rugaber et al. | 65/29 |
| 4,807,734 | 2/1989 | Breeland, Jr. et al. | 193/32 |

*Primary Examiner*—Peter Chin
*Assistant Examiner*—Jacqueline A. Ruller

[57] ABSTRACT

A glassware manufacturing system in which hot glass containers from an individual section machine are directed by an endless conveyor through a container inspection station. A container to be removed from the conveyor is identified by the inspection equipment for calibration purposes. An air jet is controlled by the inspection equipment for selectively removing the container from the conveyor into a trap, within which a progressively increasing force is applied to the container for arresting motion of the container without physical damage. The container may then be removed from the trap by an operator for manual inspection to calibrate the inspection equipment.

15 Claims, 2 Drawing Sheets

SAMPLING OF HOT GLASSWARE IN A GLASSWARE MANUFACTURING SYSTEM

The present invention is directed to manufacture of glassware, and more particularly to a method and apparatus for selectively sampling hot glassware for calibration of inspection equipment and the like.

BACKGROUND AND SUMMARY OF THE INVENTION

In the manufacture of glass containers, molten glass is molded in so-called individual section (IS) machines to form hot containers. The hot containers are placed by the machine sections on an endless belt conveyor, on which the containers are conveyed to an annealing lehr. Within the lehr, the containers are annealed for stress relief, and begin to cool. From the lehr, the containers are conveyed to various cold-end equipment for inspection, packaging etc. The lehr thus effectively divides the "hot end" from the "cold end" of the manufacturing process. U.S. Pat. No. 4,762,544 illustrates the glass manufacturing process described above.

It is proposed in U.S. application Ser. No. 08/856,829 filed May 15, 1997 to inspect glass containers at the hot end of the manufacturing process by means of optical inspection equipment disposed between the IS machine and the annealing lehr. It is difficult to calibrate such inspection equipment, however, because of the speed of movement of the conveyor and the high temperature of the glassware. Hot glassware is highly susceptible to damage due to physical contact, and it is important that glassware to be used for calibrating the inspection equipment not be damaged during the sampling process. It has been proposed as in U.S. Pat. Nos. 4,354,865 and 4,421,542 to remove glassware from the endless conveyor at the hot end of the manufacturing system by directing a jet of air onto selected containers for propelling the containers down a chute or the like. However, for calibration of inspection equipment, the likelihood of damage to the containers renders such a technique undesirable.

It is therefore a general object of the present invention to provide an apparatus, method and system for selectively removing hot articles of glassware from the conveyor at the hot end of the manufacturing system without damaging the glassware. Another and related object of the present invention is to provide a method of calibrating hot-end glassware inspection equipment that includes facility for selectively removing glassware for calibration purposes without physically damaging the sampled glassware.

Apparatus for selectively removing and holding hot glassware from a conveyor between a glassware manufacturing machine and an annealing lehr in accordance with a presently preferred embodiment of the invention includes an air jet for selectively propelling an article of glassware on the conveyor in a direction lateral to motion of the conveyor. A hot container catcher or trap is disposed on a side of the conveyor opposite the air jet for receiving a glassware article propelled from the conveyor, and for progressively engaging the glassware article so as to resist and arrest motion of the article. The glassware article is then held in position until removed by an operator. In the preferred embodiment of the invention, the article of glassware removed from the conveyor is progressively engaged by a plurality of interdigitated flexible curved vanes that are so disposed with respect to each other as to progressively increase resistance to motion of the glassware article through the vanes. The article of glassware is brought to rest over a perforated plate adjacent to a back wall, from which the article may be removed by the operator.

A method of sampling hot glassware following inspection of the glassware as the glassware moves along a conveyor between a forming machine and an annealing lehr in accordance with another aspect of the present invention includes the steps of identifying an article of glassware to be removed from the conveyor, and engaging the article with a first force lateral to the conveyor when the article reaches a preselected position along the conveyor. The article so engaged and removed from the conveyor is then engaged with a progressively increasing second force opposite to the first force so as to arrest motion of the article without damaging the article, and the article of glassware is then held in position for removal by an operator. A method of calibrating the inspection equipment in accordance with a third aspect of the invention thus includes the steps of identifying at the inspection equipment an article of glassware having a property to be calibrated, and then removing that article from the conveyor such as by directing an air jet onto the article from a direction lateral to the conveyor. The article enters the trap of the present invention, within which it is engaged by flexible vanes for progressively increasing an arresting force on the article and bringing the article to rest within the trap without damage. The article was then inspected so as to calibrate the inspection equipment.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENTS

Figure 1:
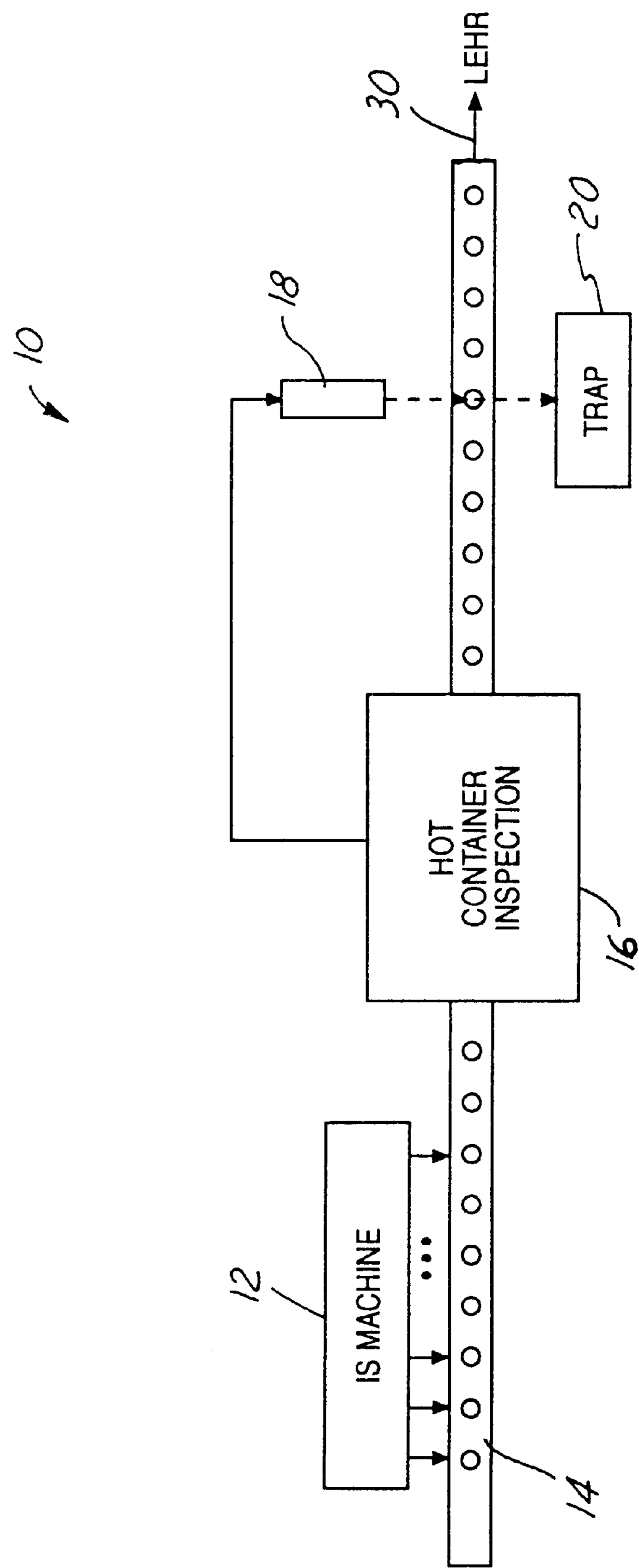
FIG. 1 is a schematic diagram of the hot end of a glassware manufacturing system within which the present invention preferably is implemented.

FIG. 1 illustrates a glassware manufacturing system 10 in accordance with a presently preferred implementation of the invention as comprising an individual section (IS) machine 12 for manufacturing articles of glassware and placing the articles in sequence on an endless belt conveyor 14. The hot glassware is transported by conveyor 14 through a hot container inspection station 16, and thence to an annealing lehr for stress relief, etc. Inspection station 16 is operatively coupled to a compressed air jet 18 for selectively directing a jet of compressed air laterally onto containers on conveyor 14 for propelling a selected container into a hot container trap 20. Inspection station 16 may be as disclosed in above-noted U.S. application Ser. No. 08/856,829 filed May 15, 1997. Air jet 18 may be as disclosed in above-noted U.S. Pat. Nos. 4,354,865 and 4,421,542.

Figure 3:
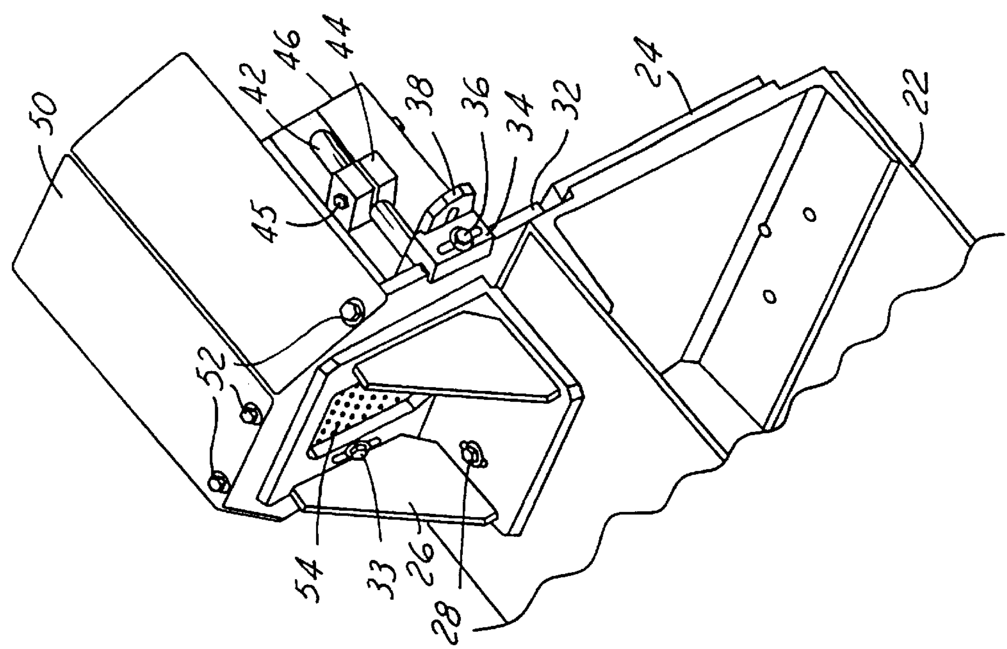
FIG. 3 is a fragmentary bottom perspective view of the trap illustrated in FIG. 2.
Figure 2:
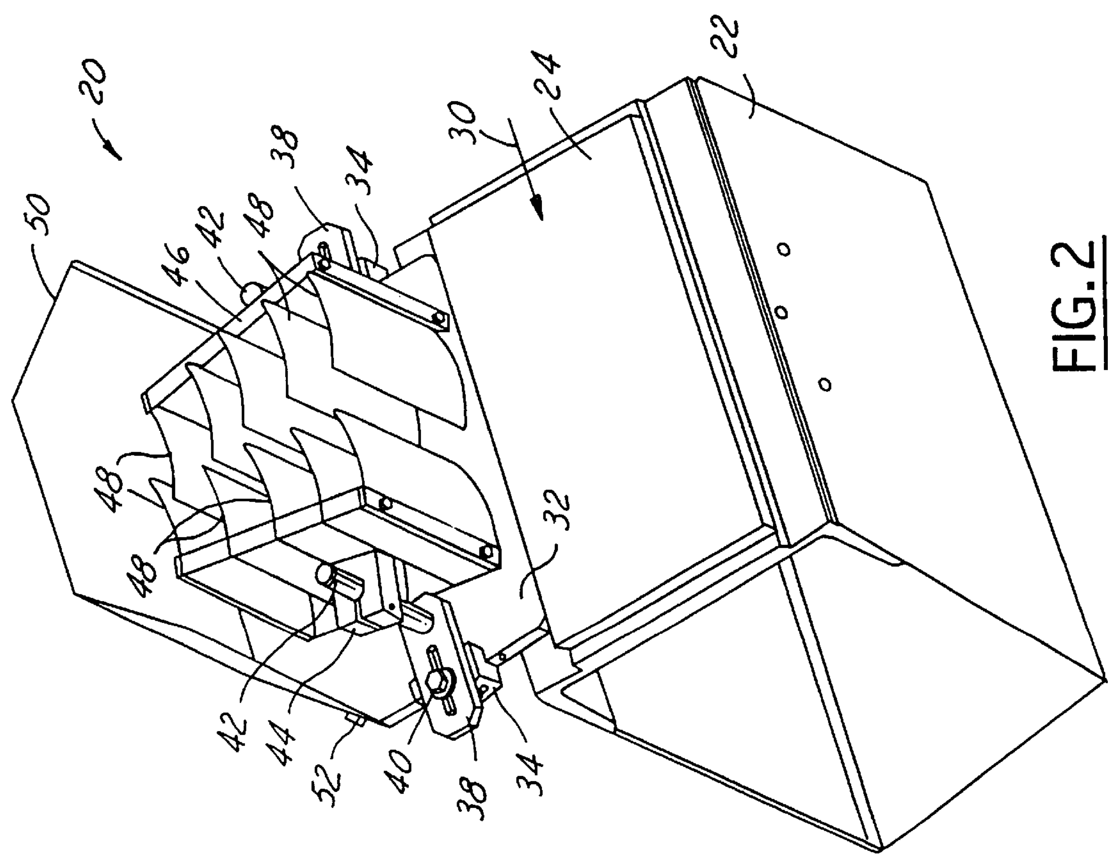
FIG. 2 is a top perspective view of a hot glassware trap in accordance with a presently preferred embodiment of the invention.

Hot container trap 20 is illustrated in greater detail in FIGS. 2 and 3. A base 22 has a friction plate 24 mounted thereon for sliding support of endless belt conveyor 14 (FIG. 1). A support bracket 26 (FIG. 3) is mounted to base 22 by longitudinally spaced screws 28. (Directional adjective such as "longitudinal" and "lateral" are taken with respect to the direction 30 of motion of the conveyor past trap 20.) Screws 28 extend through slotted openings in support bracket 26 for adjusting the vertical position of the trap assembly with respect to friction plate 24 and the conveyor sliding thereon.

Support bracket 26 supports a flat platform 32 by means of screws 33 that extend through slotted openings in bracket 26. A pair of cross guides 34 are adjustably slidably positionable along the longitudinally spaced parallel side edges of platform 32. Screws 36 extend through slotted openings in guides 34 into platform 32 for clamping the guides in adjusted position. A post slide 38 has a slotted opening through which a screw 40 extends to affix a slide 38 to each guide 34. A cylindrical post 42 extends upwardly from each slide 38. Thus, posts 42 are oriented vertically, parallel to each other and are spaced longitudinally from each other along the respective side edges of platform 32.

A clamp 44 is slidable and rotatable on each post 42, and carries a screw 45 for locking clamp 44 on post 42 at a desired adjusted position. Each clamp 44 carries a bracket 46 on which there are mounted a plurality of spaced flexible vanes 48. Vanes 48 preferably are identical with each other, and are constructed of flexible shim stock such as stainless steel or Inconel spring steel. Vanes 48 are of arcuate construction, curving away from friction plate 24 in assembly. A back guard 50 is mounted by screws 52 along the back edges of platform 32. Beneath vanes 48, platform 32 includes a section 54 of perforated metal (FIG. 3) to assist cooling of a container captured within the vanes.

In use, vein brackets 46 are adjusted with respect to each other according to the size of the containers being manufactured. In this respect, it will be noted that vane brackets 46 are adjustable vertically and angularly by means of clamps 44, and adjustable horizontally in two directions by means of slides 38 and guides 34. It is presently preferred that the vanes and brackets be adjusted with respect to each other so that the vanes are interdigitated, which is to say that the vanes from one bracket 46 alternate with the vanes on the other bracket 46 in the direction lateral to conveyor direction 30. It is also preferred that the brackets 46 be adjusted angularly with respect to each other so that the intermeshing of the vanes increase outwardly from plate 24, as shown in FIG. 2. This provides a progressively increasing force on the body of a container directed into the vanes by means of air jet 18 (FIG. 1) disposed across conveyor 14 from trap 20.

Hot glassware can thus be captured automatically and without damage so that inspection equipment 16 can be verified and be calibrated. Flexible vanes 48 preferably provide a progressively increasing force to penetration by an article of glassware, so that motion will be arrested before hitting back guard 50. The ability to vary the spacing between shims 48 and shim brackets 46, the angle of the shim brackets and the vertical position of the shim stock allows use in conjunction with containers of various sizes, shapes and weights. Curvature of the shims away from the conveyor increases flexibility in this direction of penetration while also resisting motion of containers in the reverse direction. The natural spring force of vanes 48 returns the vanes to their original position and geometry following passage or removal of a container from the trap.

I claim:

1. Apparatus for selectively removing and holding hot glassware from a conveyor between a glassware manufacturing machine and an annealing lehr, comprising:

means for selectively propelling an article of glassware on the conveyor in a direction lateral to motion of the conveyor, means for disposition on a side of the conveyor opposite said propelling means for receiving a glassware article propelled from said conveyor, said receiving means being characterized by means including a plurality of flexible vanes disposed in opposed arrays for progressively engaging the glassware article and resisting motion of the article so as to arrest motion of the article without damage, and means adjacent to said progressively engaging means for holding an article of glassware until removed by an operator.

2. The apparatus set forth in claim 1 wherein said progressively engaging means comprises means for increasingly resisting motion of the article with increasing penetration of said progressively engaging means.

3. The apparatus set forth in claim 1 wherein vanes of said arrays interdigitally alternate with each other.

4. The apparatus set forth in claim 3 wherein said vanes are curved away from said propelling means.

5. The apparatus set forth in claim 3 wherein said vanes are mounted on opposed brackets that are angulated with respect to each other.

6. The apparatus set forth in claim 1 wherein said vanes are mounted on opposed brackets that are angularly adjustable with respect to each other.

7. The apparatus set forth in claim 6 wherein said brackets include means for adjusting elevation of said brackets and said vanes with respect to said conveyor.

8. The apparatus set forth in claim 7 further comprising means for mounting said apparatus on a side of the conveyor, including means for adjusting elevation of said apparatus with respect to the conveyor.

9. The apparatus set forth in claim 7 wherein said brackets include means for adjusting position of said vanes laterally of the conveyor.

10. The apparatus set forth in claim 1 wherein said vanes are of flexible metallic construction.

11. The apparatus set forth in claim 1 wherein said holding means comprises a back opposite said propelling means.

12. The apparatus set forth in claim 11 wherein said holding means further comprises a perforated base plate.

13. A method of sampling hot glassware following inspection of the glassware as the glassware moves along a conveyor between a forming machine and an annealing lehr, said method comprising the steps of:

(a) identifying an article of glassware to be removed from the conveyor, (b) when the article identified in said step (a) reaches a preselected position along the conveyor, engaging the article with a first force lateral to the conveyor so as to remove the article from the conveyor, (c) engaging the article removed in said step (b) with a progressively increasing second force opposite to said first force so as to arrest motion of the article without damaging the article by engaging the article with a plurality of flexible interdigitated vanes, and (d) holding the article for removal by an operator.

14. The method set forth in claim 13 wherein said vanes are curved away from said first force.

15. In a glassware manufacturing system that includes an individual section machine for depositing articles of glassware on an endless conveyor to an annealing lehr and means for inspecting glassware on said conveyor between said machine and said lehr, a method of calibrating said inspection means comprising the steps of:

(a) identifying at said inspection station an article of glassware having a property to be calibrated, (b) when the article of glassware identified in said step (a) reaches a preselected position along the conveyor, directing a jet of air into the glassware article from a direction lateral to the conveyor to remove the article from the conveyor, (c) engaging the article removed in said step (b) with a plurality of flexible interdigitated vanes that produce a progressively increasing second force opposite to said first force so as to arrest motion of the article without damaging the article, and (d) inspecting the article of glassware removed in said step (c) to calibrate the inspection means.

* * * * *